United States Patent [19]

Evans et al.

[11] Patent Number: 4,699,004
[45] Date of Patent: Oct. 13, 1987

[54] PRESSURE SENSING

[75] Inventors: John M. Evans; Philip B. Atkins; Peter N. Doogood, all of Victoria, Australia

[73] Assignee: Commonwealth of Australia, Canberra, Australia

[21] Appl. No.: Mar. 7, 1985
[22] PCT Filed: Jan. 7, 1986
[86] PCT No.: PCT/AU85/00043
 § 3.71 Date: Jan. 7, 1986
 § 102(e) Date: Jan. 7, 1986
[87] PCT Pub. No.: WO85/04012
 PCT Pub. Date: Sep. 12, 1985

[30] Foreign Application Priority Data

Mar. 7, 1984 [AU] Australia ............................. PG3947

[51] Int. Cl.$^4$ .......................... G01C 21/00; G01L 7/00
[52] U.S. Cl. .................................. 73/384; 73/178 R; 73/700
[58] Field of Search .................. 73/180, 179, 182, 188, 73/189, 178 R, 178 T, 178 H, 700, 384

[56] References Cited

U.S. PATENT DOCUMENTS

| 2,270,476 | 1/1942 | Rollin | 73/384 |
| 3,034,353 | 5/1952 | Anderson | 73/861.65 |
| 3,050,996 | 8/1962 | Henderson | 73/182 |
| 3,094,868 | 6/1963 | Andersen, Jr. et al. | 73/178 R |
| 3,520,184 | 7/1970 | Tanner et al. | 73/182 |
| 3,646,811 | 3/1972 | Deleo et al. | 73/182 |
| 4,292,671 | 9/1981 | Evans et al. | 73/384 |
| 4,444,060 | 4/1984 | Yamamoto | 73/861.65 |
| 4,481,829 | 11/1984 | Shortridge | 73/861.66 |

FOREIGN PATENT DOCUMENTS 0056747 of 0000 European Pat. Off. .

Primary Examiner—Donald O. Woodiel
Attorney, Agent, or Firm—Mason, Fenwick & Lawrence

[57] ABSTRACT

A pressure sensing device for a body movable in a fluid in a direction transverse to the longitudinal axis of the body. A chamber is provided within the body and a plurality of bores extend radially from the chamber to outer ends opening to ambient fluid so that, as the body moves, any pressure differential between the outer end and inner end causes fluid flow in the bore. Each bore is a flow restricting device such as a valve or fluidic diode, and operable to restrict outward flow from the inner end to the outward end more than inward flow thus causing the pressure in the chamber to be higher than the average pressure at the outer ends. A fluid pressure measuring device is provided in the chamber.

9 Claims, 4 Drawing Figures

PRESSURE SENSING

TECHNICAL FIELD

This invention relates to apparatus for sensing the ambient pressure of fluid around a moving body. The invention has been particularly developed for sensing the ambient air pressure around a rocket in the atmosphere thereby enabling pressure altitude determination and it will be convenient to describe the invention with particular reference to this use, but the invention is not limited to this specific use.

BACKGROUND ART

Altitude sensing in aircraft and rockets has been achieved in the past in several ways. For example, barometric altimeters have been used, as have radar based systems. It is also possible to use data from an inertial or other navigation system relating to vehicle movements and to calculate or estimate the altitude from that data.

It has been proposed to provide a defence against a self-guided target seeking missile by means of a decoy rocket which is launched upon detecting an approaching missile. It is proposed that the decoy rocket slowly move away from the target such as a ship while at the same time emitting strong signals intended to be detected by the approaching missile so that the missile will guide itself towards the decoy rocket rather than the target. The flight control unit for such a decoy rocket is desirably self-contained, that is there will be no direct control from the launch site. The flight control unit will be operable to gather data such as the height, movement direction, speed and attitude of the rocket, to determine the desired flight path of the rocket and to carry out the flight control operations.

Since the decoy rocket is intended to be expendable, the component parts should therefore be relativey inexpensive. The simplest altitude determining system known and expected to provide suitable accuracy for such a rocket would be based on barometric pressure sensing. However, the decoy rocket is intended to be movable generally horizontally in any direction without the direction of movement being accurately known or even approximately known in relation to the configuration of the rocket itself. That is, the direction of movement of the rocket in relation to the configuration of the rocket will not be predetermined in advance or will not be predetermined for the remainder of the flight after launch.

One problem with measuring the rocket altitude based on barometric pressure measurement partially results from the configuration and nature of movement of the rocket. For example, it is expected that the decoy rocket will be generally cylindrical and be about seven feet long and about six inches in diameter. The rocket will be launched and the axis of the cylindrical body is expected to be generally vertical. The rocket is expected to have a zero or small vertical speed so that it can hover or rise slowly and also move generally horizontally to attract the approaching missile from its target. For the flight control unit of the decoy rocket to effectively operate, the altitude and vertical speed of the rocket must be known at least approximately.

With this type of rocket fluid pressure differentials will be created around the rocket body surface as the body moves horizontally relative to the fluid, i.e. with a component of velocity of the body being transverse to the vertical longitudinal axis of the body. For example, in the case of the generally cylindrical body of a decoy rocket body which is arranged with its longitudinal axis generally vertical and moving in air in a horizontal direction, the portion of the body surface which is moving in a forward direction relative to the air will experience a positive net air pressure while the two "sides" of the cylindrical body will each experience a negative net pressure due to the air flow over those side surfaces and the "back" surface will also experience a negative net pressure—see FIG. 1 of the accompanying drawings where the pressure distribution curve P around a cylindrical surface moving in a field is schematically illustrated. The magnitude of the net pressure at any point on the surface of the body, at least on a relative scale, may be estimated from the pressure distribution curve P in FIG. 1 by measuring the length of a line drawn radially from the desired point on the body surface to the pressure distribution curve P.

Because the net pressures at the body surface vary from ambient pressure depending on the speed and direction of relative horizontal movement, it will not be possible to reliably and accurately determine the ambient barometric pressure simply by taking an air pressure reading at one point of the body surface. Also, because the direction of relative body movement will not be known in relation to the body configuration, it will not be possible to determine ambient air pressure by locating a pressure sensor at one of the two points of the body surface where the net air pressure is zero, i.e. where the absolute pressure equals the ambient static air pressure.

Altitude sensing or determination for the rocket using signals received from the launch site are also expected to be unsuitable, because these signals may be subject to accidental or deliberate interference.

DISCLOSURE OF INVENTION

It is an object of the present invention to provide a pressure sensing means for a body relatively movable in a fluid and for sensing or determining ambient fluid pressure in a case where the body is movable in a plurality of directions relative to the body configuration.

It is a further object of the present invention to provide a pressure sensing means for a body relatively movable in a fluid and which is relatively simple and inexpensive.

According to the present invention, there is provided a pressure sensing means for a body relatively movable in a fluid and for determining ambient fluid pressure, the body being movable in a plurality of directions relative to the body configuration, the body having a longitudinal axis and a component of the velocity of the body relative to the fluid being transverse to the longitudinal axis, the pressure sensing means being characterised by: a chamber within the body; a plurality of passages, each one of the plurality of passages having an inner end opening into the chamber and an outer end opening to the ambient fluid at a respective one of a plurality of circumferentially spaced locations relative to the longitudinal axis such that in each passage a pressure differential between the outer end and the inner end of that passage causes fluid flow in the passage related to the pressure difference; a plurality of flow restricting means, each flow restricting means being associated with a respective passage, each flow restricting means being operble to preferentially restrict fluid flow in the outward direction from the inner end to the outer end of the associated passage relative to the inward direction so that, upon movement of the body relative to the ambient fluid with a component of the velocity of the body relative to the fluid being transverse to the longitudinal axis the pressure in the chamber will be higher than the average pressure at the outer ends of the passages; and fluid pressure measuring means located within the chamber and operable to measure the fluid pressure within the chamber.

The relative resistance of each flow restricting means to fluid flow in the inward direction, i.e. the inflow-to-outflow resistance ratio, may be chosen such that the fluid pressure in the chamber equals the static pressure of the ambient fluid. In this case, the fluid pressure measuring means will provide a direct determination of the ambient fluid pressure.

The present invention also provides an altitude determining means for a flying craft and characterised by a pressure sensing means as outlined above, storage means for storing a measure of air pressure at sea level in the vicinity of the craft, and processing means for determining from the stored sea level air pressure measure and the measured air pressure within the chamber of the pressure sensing means the altitude of the craft. The rate of altitude change and hence the rate of ascent or descent of the craft independent of any horizontal component of the velocity of the craft may be provided by the processing means being made operable to calculate the first derivative of the altitude.

BRIEF DESCRIPTION OF DRAWINGS

The accompanying drawings illustrate principals and preferred features of pressure sensing means according to the present invention, however it is to be appreciated that the particularity of the accompanying drawings is not limiting on the present invention. In the drawings.

MODES FOR CARRYING OUT THE INVENTION

Figure 1:
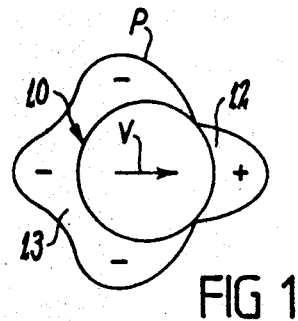
FIG. 1 shows the air pressure distribution around a cylinder moving relative to ambient air in the direction V transverse to the cylinder axis.

The pressure sensing means is for a body 10 relatively movable in a fluid and for determining ambient fluid pressure. The body 10 is movable in a plurality of directions relative to the body configuration. The body 10 has a longitudinal axis 33 and a component of the velocity of the body 10 relative to the fluid is transverse to the longitudinal axis 33. For example, referring to FIG. 1, the body 10 may be movable in the direction of arrow V so as to create positive net pressure region 12 at the "front" of the body and negative net pressure region 13 at the "sides" and "back" of the body 10.

Figure 2:
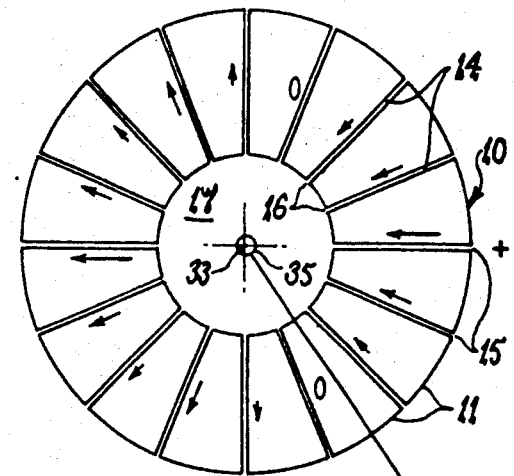
FIG. 2 shows a cross-section through a rocket body having a central chamber with radial passages (without flow restricting means)
Figure 2:
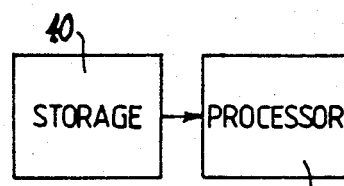
Figure 3:
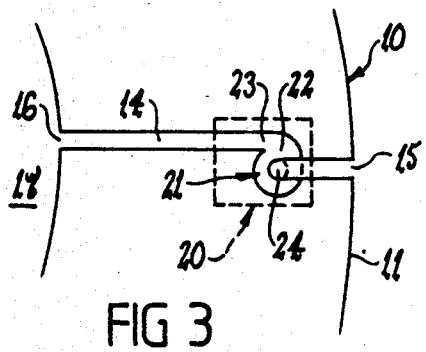
FIG. 3 shows a detailed of a passage with a fluidic diode therein.
Figure 4:
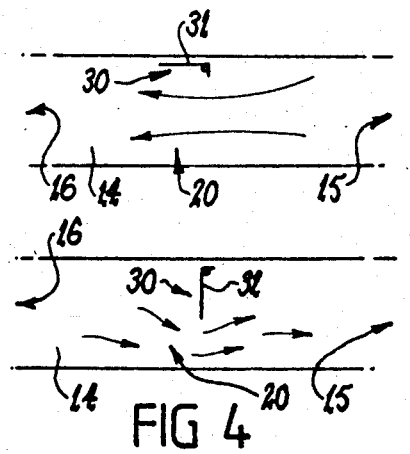
FIG. 4 shows a section of a passage with a flap valve arrangement partially restricting outwards flow but allowing substantially unrestricted inward flow.

The pressure sensing means includes a plurality of passages 14 (FIG. 2), each one of the passages 14 having an inner end 16 opening into a chamber 17 within the body and an outer end 15 opening to the ambient fluid at a respective one of a plurality of circumferentially spaced locations relative to the longitudinal axis 33. With this arrangement in each passage 14 a pressure differential between the outer end 15 and the inner end 16 of that passage 14 causes fluid flow in the passage related to the pressure difference. As shown in FIGS. 3 and 4, associated with each passage 14 is a flow restricting means 20. Each flow restricting means 20 is operable to preferentially restrict fluid flow in the outward direction from the inner end 16 to the outer end 15 of the passage 14 relative to the inward direction so that upon movement of the body 10 relative to the ambient fluid with a component of the velocity of the body 10 relative to the fluid being transverse to the longitudinal axis 33, the pressure in the chamber 17 will be higher than the average pressure at the outer ends 15 of the passages 14. Also, this means that under expected conditions of movement of the body 10, the pressure in the chamber 17 will be higher than the average pressure that would result from not including flow restricting means 20 in the passages 14. Fluid pressure measuring means 35 is located within the chamber 17 and is operable to measure the fluid pressure within the chamber 17. By choosing a particular relative resistance of each flow restricting means 20 to fluid flow in the inward direction, the fluid pressure in the chamber 17 may be generally equal to the static pressure of the ambient fluid. The choice of the specific desired inflow-to-outflow resistance ratio may be made by the man skilled, e.g. after conducting wind tunnel tests of a cylindrical body having passages 14 to the central chamber 17 having preferential direction flow restricting means of different inflow-to-outflow resistance ratios.

In the case of the pressure sensing means according to the present invention being used in a decoy rocket as outlined earlier, the determination of the ambient air pressure will provide part of the data needed to determine the instantaneous altitude of the rocket. The other main item of data needed for altitude determination is the air pressure at sea level. In the case of the rocket being launched from a ship, immediately prior to rocket launching, the air pressure at sea level can be determined by the pressure sensing means or can be supplied to a processing means 41 such as a computer within the rocket so that that air pressure reading can be used as a datum in altitude determination after launch. That is, the difference between the measured air pressure in chamber 17 at any time after launch and the sea level air pressure immediately prior to launch enables calculation of the instantaneous rocket altitude above sea level.

The present invention also provides an altitude determining means for a flying craft and comprising a pressure sensing means as described above, storage means 40 for storing a measure of air pressure at sea level in the vicinity of the craft and processing means 41 for determining from the stored sea level air pressure measure and to measure the air pressure within the chamber 17 the altitude of the craft.

Since the present invention enables the provision of a means of continuously determining the instantaneous altitude of a flying craft, it is possible to derive a measure of the rate of altitude change and hence provide a reading of the rate of ascent or descent of the craft independent of any horizontal component of velocity of the craft by calculating the first derivative of the altitude. Thus, the process of 41 may be operable to calculate the instantaneous rate of change of the altitude by calculating this first derivative. The processor 41 may conveniently comprise an appropriately programmed microprocessor or computer.

Returning now to the preferred construction of the pressure sensing means, each passage 14 extends outwardly from the chamber 17 to the outside surface 11 of the body 10 and opens at that outer end 15 to the ambient fluid. The body 10 is generally cylindrical and the chamber 17 is symmetrically located centrally within the cylindrical body 10. The passages 14 are comprised by substantially identical bores extending straight from the chamber 17 within the body 10 to the outside surface 11 of the body 10. In particular, the bores 14 extend substantially radially outwardly in a plane at right angles to the longitudinal axis 33 of the cylindrical body 10. As shown in FIG. 2, the bores 14 are provided at equal angular intervals, the intervals shown being of 30°, although smaller intervals may be provided to provide an increased number of bores. In FIG. 2 twelve radial bores spaced at 30° intervals around the longitudinal axis 33 of the body 10 are provided.

The chamber 17 is of relatively large volume compared to the total volume of the radial bores 14 so that the fluid pressure within the chamber 17 remains approximately constant. Under steady conditions with the body 10 moving in a direction transverse to the body axis 33 at a constant velocity relative to the ambient fluid, it is expected that, without the preferential direction flow restricting means 20, the pressure within the chamber 17 would be nearly equal to average pressure of the circumferential pressure distribution. This would result in a fluid pressure in the chamber 17 being less than the ambient static fluid pressure. However, by providing the differential flow restricting means 20, the fluid pressure in the chamber 17 can be maintained approximately equal to the ambient fluid pressure.

In the embodiment of FIG. 4, each flow restricting means 20 comprises a valve means 30 which allows substantially unrestricted flow in the inward direction from the outer end 15 to the inner end 16 of the associated passage 14, but which restricts, without entirely preventing, outward flow. The valve means 30 illustrated comprises a flap valve arrangement having a hinged flap 31 arranged to only partially obstruct the associated passage 14 when the passage 14 is experiencing flow from the inner end 16 to the outer end 15, but which is arranged to hingedly move so as to open the passage 14 to relatively unrestricted flow when the passage 14 is experiencing fluid flow from the outer end 15 to the inner end 16.

In the alternative possible embodiment of FIG. 3, each of the flow restricting means 20 comprises a fluidic diode 21 located in the associated passage 14. Each fluidic diode 21 is arranged and operable to provide a lesser resistance to flow of fluid in the associated passage 14 in the inward direction from the passage outer end 15 to the inner end 16 than in the outward direction. With this arrangement, during movement of the body 10 in the ambient fluid, the differential restriction of the flow of fluid in the passage 14 generally maintains the fluid pressure in the chamber 17 substantially equal to the static pressure of the ambient fluid. The fluidic diodes 21 may be of generally conventional construction and operation and therefore may each include an upstream mouth 24 opening centrally and laterally into a chamber 22, at a downstream mouth 23 opening into the chamber 22 tangentially. In this diode construction, fluid flow from the upstream mouth 24 to the downstream mount 23 experiences less resistance to flow and flow in the opposite direction. The fluidic diodes 21 are arranged in the passages 14 with their downstream and upstream mouths, 23,24, communicating with the passage inner and outer ends 16,15 respectively.

The pressure sensing means of the present invention may be used with the movement parameter sensing means described in the Australian Patent Application PG 3946 and the PCT application based thereon and being lodged at the same time as this application. Reference may be made to that other application for further details.

The pressure sensing means of the preferred embodiment of the present invention as herein described and illustrated is relatively simple in construction and consists of components which can be cheaply manufactured and assembled. However, it is expected that the accuracy of the pressure determination will be quite high enabling altitude and vertical speed calculations.

We claim:

1. A pressure sensing device for a body (10) that is relatively movable in a fluid and for determining ambient fluid pressure, the body (10) being movable in a plurality of directions, the body having a longitudinal axis (33) and a component of the velocity of the body (10) relative to the fluid being transverse to the longitudinal axis (33), said pressure sensing device comprising:

a chamber (17) within the body (10);

a plurality of passages (14), each one of the plurality of passages (14) having an inner end (16) opening into the chamber (17) and an outer end (15) opening to the ambient fluid at a respective one of a plurality of circumferentially spaced locations relative to the longitudinal axis (33) such that in each passage (14) a pressure differential between the outer end (15) and the inner end (16) of that passage (14) causes fluid flow in the passage (14) related to the pressure difference;

a plurality of flow restricting means (20), each flow restricting means (20) being associated with a respective passage (14), each flow restricting means (20) being operable to restrict fluid flow in the outward direction from the inner end (16) to the outer end (15) in the associated passage (14) relative to the inward direction so that upon movement of the body (10) relative to the ambient fluid with a component of the velocity of the body (10) relative to the fluid being transverse to the longitudinal axis (33), the pressure in the chamber (17) will be higher than the average pressure at the outer ends (15) of the passages (14); and measuring means (35) located within the chamber (17) for measuring fluid pressure within the chamber.

2. A pressure sensing device as claimed in claim 1 wherein the relative resistance of each flow restricting means (20) to fluid flow in the inward direction is chosen such that the fluid pressure in the chamber (17) generally equals the static pressure of the ambient fluid.

3. A pressure sensing device as claimed in claim 1 wherein the body (10) is generally cylindrical and the chamber (17) is symmetrically located centrally within the cylindrical body (10), the passages (14) being comprised by bores extending substantially radially outwardly from the chamber (17) in a plane at right angles to the longitudinal axis (33) of the cylindrical body (10).

4. A pressure sensing device as claimed in claim 3 wherein the chamber (17) is of relatively large volume compared to the total volume of the radial bores (14) whereby the fluid pressure within the chamber (17) remains approximately constant.

5. A pressure sensing device as claimed in claim 1 wherein each of the flow restricting means (20) comprises a valve means (30) which allows substantially unrestricted flow in the inward direction from the outer end (15) to the inner end (16) of the associated passage (14) but which restricts, without entirely preventing, outward flow.

6. A pressure sensing device as claimed in claim 5 wherein the valve means (30) comprises a flap valve arrangement having a hinged flap (31) arranged to only partially obstruct the associated passage (14) when the passage (14) is experiencing flow from the inner end (16) to the outer end (15), but which is arranged to hingedly move so as to open the passage (14) to relatively unrestricted flow when the passage (14) is experiencing fluid flow from the outer end (15) to the inner end (16).

7. A pressure sensing means as claimed in claim 1 wherein each of the flow restricting means (20) comprises a fluidic diode (21) located in the associated passage (14), each fluidic diode (21) being arranged and operable to provide a lesser resistance to flow of fluid in the associated passage (14) in the inward direction from the passage outer end (15) to the inner end (16) than in the outward direction, whereby during movement of the body (10) in the ambient fluid, the differential restriction of the flow of fluid in the passages (14) generally maintains the fluid pressure in the chamber (17) substantially equal to the static pressure of the ambient fluid.

8. An altitude determining apparatus for a flying craft and comprising a pressure sensing device as claimed in claim 1, storage means (40) for storing a measure of air pressure at sea level in the vicinity of the craft, and processing means (41) for determining from the stored sea level air pressure measure and the measured air pressure within the chamber (17) of the pressure sensing means the altitude of the craft.

9. An altitude determining apparatus as claimed in claim 8 wherein the processing means (41) is further operable to calculate the first derivative of the altitude to provide a measure of the rate of altitude change and hence provide a reading of the rate of ascent or descent of the craft independent of any horizontal component of velocity of the craft.

* * * * *

UNITED STATES PATENT AND TRADEMARK OFFICE
CERTIFICATE OF CORRECTION

PATENT NO. : 4,699,004
DATED : October 13, 1987
INVENTOR(S) : Evans et al

It is certified that error appears in the above-identified patent and that said Letters Patent is hereby corrected as shown below:

On the cover page of the captioned patent, please correct as follows:

Line [21] Appl. No.:, delete "Mar. 7, 1985" and insert --802,008--.

Signed and Sealed this

Twelfth Day of April, 1988

*Attest:*

DONALD J. QUIGG

*Attesting Officer*   Commissioner of Patents and Trademarks